(12) United States Patent
Heimann et al.

(10) Patent No.: US 7,600,425 B2
(45) Date of Patent: Oct. 13, 2009

(54) FLOAT FOR A FILL LEVEL SENSOR

(75) Inventors: Sigrid Heimann, Eppstein (DE); Dieter Keller, Aschaffenburg (DE); Rainer Moser, Idstein (DE); Bernd Pauer, Eppstein (DE); Bettina Seibert, Trebur (DE)

(73) Assignee: Siemens Aktiengesellschaft, Munich (DE)

( * ) Notice: Subject to any disclaimer, the term of this patent is extended or adjusted under 35 U.S.C. 154(b) by 49 days.

(21) Appl. No.: 10/559,421

(22) PCT Filed: May 14, 2004

(86) PCT No.: PCT/EP2004/050810

§ 371 (c)(1), (2), (4) Date: Feb. 21, 2006

(87) PCT Pub. No.: WO2004/111582

PCT Pub. Date: Dec. 23, 2004

(65) Prior Publication Data

US 2007/0272009 A1 Nov. 29, 2007

(30) Foreign Application Priority Data

Jun. 12, 2003 (DE) .............................. 103 26 982

(51) Int. Cl.
*G01F 23/76* (2006.01)
(52) U.S. Cl. ..................................... 73/322.5
(58) Field of Classification Search ................. 73/322.5
See application file for complete search history.

(56) References Cited

U.S. PATENT DOCUMENTS

| | | | |
|---|---|---|---|
| 3,615,972 A * | 10/1971 | Morehouse et al. ........... 156/79 |
| 4,158,964 A | 6/1979 | McCrea et al. |
| 4,193,057 A * | 3/1980 | Bennett et al. .............. 367/153 |
| 4,425,449 A * | 1/1984 | Dorsey ....................... 523/218 |
| 4,778,502 A * | 10/1988 | Garnier et al. ................ 65/21.4 |
| 4,823,827 A * | 4/1989 | Olejak ............................ 137/2 |
| 5,095,933 A * | 3/1992 | Olejak ......................... 137/207 |
| 5,333,499 A | 8/1994 | Gaston |
| 5,459,959 A | 10/1995 | Paradis |
| 6,106,419 A * | 8/2000 | Hall et al. .................... 473/604 |
| 6,557,412 B1 * | 5/2003 | Barbier et al. ................. 73/313 |
| 6,938,480 B2 * | 9/2005 | Canales ........................ 73/313 |
| 2004/0079151 A1 * | 4/2004 | Canales ........................ 73/313 |
| 2007/0272009 A1 | 11/2007 | Heimann et al. |

FOREIGN PATENT DOCUMENTS

| | | |
|---|---|---|
| DE | 690 19 897 T2 | 3/1991 |
| DE | 195 40 532 A1 | 5/1997 |
| DE | 197 40 058 A1 | 3/1999 |

(Continued)

*Primary Examiner*—Hezron Williams
*Assistant Examiner*—Rodney T Frank
(74) *Attorney, Agent, or Firm*—Cohen Pontani Lieberman & Pavane LLP

(57) ABSTRACT

The invention relates to a float (5) for a fill level sensor, comprised of a fuel-resistant plastic (7), an expanding means (8) and/or filler (9), whereby the expanding means consists of gas-filled plastic balls (11) that are provided in the form of microspheres (8), and the filler consists of micro-hollow balls (9). The microspheres (8) and the micro-hollow balls (9) are surrounded by fuel-resistant plastic (7).

18 Claims, 1 Drawing Sheet

| | FOREIGN PATENT DOCUMENTS | | |
|---|---|---|---|
| DE | 103 26 982 | 6/2003 | |
| EP | 0 350 185 | 1/1990 | |
| EP | 1 012 543 B1 | 6/2000 | |
| FR | 72.40976 | 6/1973 | |
| JP | 57-210510 | 12/1982 | |
| JP | 61-053521 | 3/1986 | |
| JP | 01212319 A | 8/1989 | |
| JP | 2002156274 | 5/2002 | |

* cited by examiner

FLOAT FOR A FILL LEVEL SENSOR

BACKGROUND OF THE INVENTION

The subject of the invention is a float for a fill level sensor, comprising a fuel-resistant plastic, an expanding means and/or a filler. Floats of this type are used in fill level sensors in fuel tanks of motor vehicles.

Floats made of fuel-resistant material are generally known. On account of the low density of fuel, floats must have a particularly low density. An additional difficulty is that, for the most part, lever-type sensors are used as fill level sensors. In the case of a fill level sensor formed as a lever-type sensor, the float is fastened to a lever wire. Also arranged on the lever wire is a sliding contact, which slides over a resistor network. The float must consequently have a much lower density than the fuel, since it has to compensate not only for its own weight but also for the weight of the lever wire. In the case of a fuel density of approximately 0.7 g/cm$^3$, floats of this type must therefore have a density of less than 0.5 g/cm$^3$.

A material which is both fuel-resistant and has an adequately low density is nitrophyl. Nitrophyl is a plastic containing sulfur. The disadvantage of nitrophyl is its complex production, which necessitates stringent requirements with regard to environmental protection because of the sulfur content.

Other known fuel-resistant materials are POM (polyoxymethylene) and PA (polyamide). However, the production of foamed floats from these materials is extremely complex. A further disadvantage is that foaming produces an open-cell foam, the cells of which are interconnected and therefore become flooded with fuel if the outer layer of the float is damaged. As a result, the float loses its buoyancy, which leads to failure of the fill level sensor.

It is also known to produce floats as hollow bodies from POM or PA. These floats have the disadvantage that, when they are used in a motor vehicle, the shell of the float can be damaged as a result of the dynamics of the vehicle movement. The leakage causes the float to be flooded, whereby it loses its buoyancy, which leads to failure of the fill level sensor. Floats comprising hollow bodies have therefore been unable to become widely adopted as fill level sensors in motor vehicles.

BRIEF DESCRIPTION OF THE INVENTION

The object of the invention is to provide a float for use in fuels, with the intention that the float does not contain any sulfur, is easy to produce and is resistant to dynamic loads.

The object is achieved according to the invention by the float containing microspheres as an expanding agent, the microspheres being gas-filled plastic balls.

Adding microspheres as an expanding agent allows a much smaller amount to be admixed than in the case of other expanding agents. The heating during production causes the plastic shell to soften, so that the gas can make the plastic shell expand and the volume of the microsphere increases by a factor of 40. The plastic shell of the microspheres remains intact after the expansion. The shells of the microspheres have the effect that each cavity is self-contained, so that, even in the event of the float becoming damaged, the cavities that are not affected remain and ensure the buoyancy of the float.

The fuel-resistant plastic surrounds the microspheres and reliably protects them from being attacked by the fuel. At the same time, it has the necessary strength to be durable in withstanding dynamic loads.

On account of the high expansion factor of the microspheres, more expensive starting materials can also be used both for the fuel-resistant plastic and for the microspheres, since the proportion of material contained in the float that is made up by the microspheres and the fuel-resistant plastic is small on account of the low density achieved. The float according to the invention is therefore particularly inexpensive.

On account of the great expansion of the microspheres, particularly low admixed amounts are sufficient to achieve a low density of the float. It has been found that, to obtain a proportion of approximately 85% of microspheres in the float, it is sufficient for amounts of the order of 10% to be admixed in the production process. Floats of this type have a density of approximately 0.2 g/cm$^3$. They are consequently ideally suited for use in fuels. Depending on the place where they are to be used, the density can be varied by the proportion of microspheres in the float. Admixed amounts of microspheres from 3% to 20% in the production process have been found to be advantageous.

A low density of the float is achieved if the microspheres have an average sphere diameter of from 30 μm to 40 μm, in particular from 34 μm to 38 μm. In this case, the microspheres retain their closed shell, so that the float is interspersed with cavities that are self-contained and consequently separated from one another.

The object is also achieved by the float containing micro hollow balls as a filler. The micro hollow balls, based on glass, likewise lead to a significant reduction in the density on account of the cavities. Since micro hollow balls are much less expensive than microspheres, particularly inexpensive floats can be produced by using them.

For a sufficiently low density of the float, micro hollow balls with an apparent density of from 0.09 g/cm$^3$ to 0.1 g/cm$^3$ have proven successful. The proportion of micro hollow balls may be up to 98%. Float densities of less than 0.5 g/cm$^3$ are achieved with a proportion of micro hollow balls of over 70% in the float.

Furthermore, the object is achieved by a float which contains micro hollow balls and microspheres. The use of micro hollow balls already leads to a reduction in the density, so that the proportion of microspheres to achieve lower float densities can be lowered. A float of this type can be produced particularly inexpensively with a particularly low density.

The proportions of microspheres and micro hollow balls are variable within wide limits, depending on the place where the float is to be used. For instance, on account of the higher density of diesel fuel of 0.4 g/cm$^3$, floats for diesel fuel may have a greater density than floats for gasoline. The amounts of micro hollow balls that are admixed may vary between 3% and 60%, while the microspheres are added in a proportion of between 3% and 20% during the production process. Good processing of the starting materials by means of injection molding, casting or extrusion is achieved with a proportion of micro hollow balls in the float of up to 50%.

On account of the low density of the float according to the invention, virtually all fuel-resistant plastics can be used. Thermoplastic materials that have proven successful in particular are POM, PA, PPS (polyphenylene sulfide), PEEK (polyaryletherketone), HDPE (high-density polyethylene), PBT (polybutylene terephthalate), PET (polyethylene terephthalate) and PPA (polyphthalamide). In the case of thermosetting materials, casting resins based on phenolic resins and epoxy resins are particularly suitable.

The production of the float from a thermoplastic material as the plastic-resistant plastic takes place by means of injection molding, extrusion or compression molding. If thermosetting materials are used as the fuel-resistant plastic, the float can be produced by casting, extrusion or compression molding.

By deliberately selecting whether to admix microspheres and/or micro hollow balls, the density of the float can be specifically set in a wide range from 0.15 g/cm³ to 0.5 g/cm³. While a density of 0.4 g/cm³ is already sufficient for use of the float in diesel fuel, floats that are used in gasoline have a density of from 0.25 g/cm³ to 0.15 g/cm³.

In order to connect the float to the lever wire of the fuel level sensor, the float has a receptacle for the lever wire. A receptacle that can be produced particularly easily is achieved with a receptacle in the float that is formed as a bore. A bore of this type can be produced inexpensively during the production of the float, for example by placing a core in the float mold.

BRIEF DESCRIPTION OF THE DRAWINGS

The invention is explained in more detail on the basis of an exemplary embodiment. In the drawing.

DETAILED DESCRIPTION OF THE INVENTION

Figure 1:
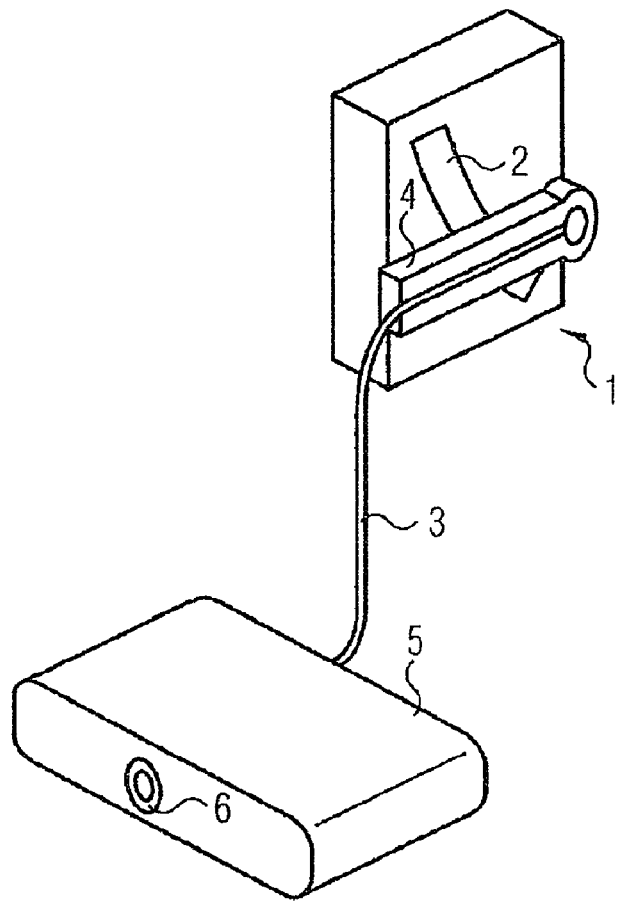
FIG. 1 shows a float according to the invention and
FIG. 2 shows a detail of an enlarged representation of a section through the float as shown in FIG. 1.

FIG. 1 shows a fill level sensor 1 for a feeding unit in a fuel tank of a motor vehicle. The fill level sensor 1 comprises a thick-film resistor 2 and a lever wire 3. Fastened in the lever wire 3 is a sliding contact 4, which slides over the thick-film resistor 2. Arranged at the end of the lever wire 3 is a float 5, the float 5 having a receptacle formed as a bore 6, in which the lever wire 3 is arranged in such a way that the float 3 is mounted freely rotatably on the lever wire 3. The float has a length of 64 mm, a width of 32 mm and a height of 16 mm, so that the volume of the float 5 is 32.77 cm³.

Figure 2:
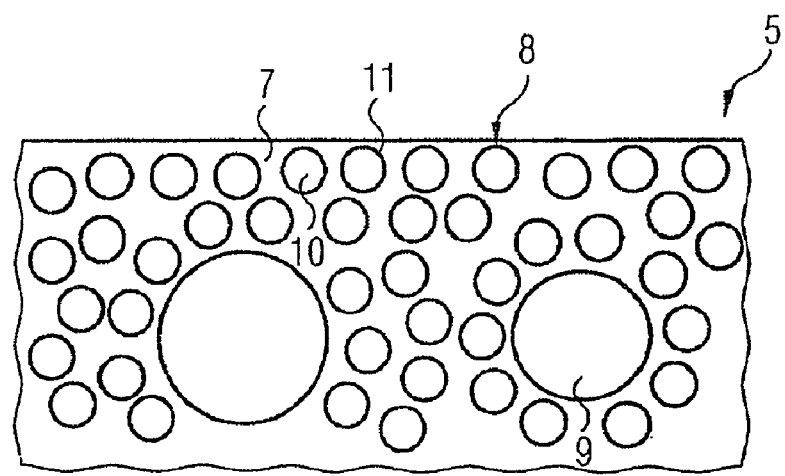

FIG. 2 shows a section through the float in FIG. 1. 12.6% of the float consists of POM 7, in which the microspheres 8 and the micro hollow balls 9 are embedded. The microspheres 8 are plastic balls 11 filled with a gas 10, as are offered by the company AKZO NOBEL under the trade name Expancel. The microspheres 8 have a diameter of 36 μm. The proportion of the microspheres 8 is 81.9%. The micro hollow balls 9, based on glass, have a greater diameter than the microspheres 8. For better representation, the microspheres 8 are drawn larger. The proportion of the micro hollow balls 9 is 5.5%. The density of the float 5 is 0.2 g/cm³.

The following table shows the achievable densities and the proportions of the constituents for the float 5 in the case of admixing 10% of Expancel 8 into the starting materials for various mixing ratios of POM 7 to micro hollow balls 9.

| POM | Micro hollow balls | Density of float | Proportion of POM | Proportion of Expancel | Proportion of micro hollow balls |
|---|---|---|---|---|---|
| 90% | 10% | 0.21 g/cm³ | 13.50% | 85.00% | 1.50% |
| 70% | 30% | 0.20 g/cm³ | 12.60% | 81.90% | 5.50% |
| 50% | 50% | 0.19 g/cm³ | 11.50% | 77.00% | 11.50% |
| 30% | 70% | 0.17 g/cm³ | 9.40% | 68.70% | 21.90% |
| 10% | 90% | 0.13 g/cm³ | 4.90% | 50.70% | 44.70% |

The second table shows the density and the proportions of POM 7 and Expancel 8 for various admixed amounts of Expancel 8 in the starting materials for a float 5, comprising POM 7 and Expancel 8.

| POM | Expancel (starting material) | Density | Proportion of POM | Proportion of Expancel |
|---|---|---|---|---|
| 90% | 10% | 0.22 g/cm³ | 13.75% | 86.25% |
| 95% | 5% | 0.37 g/cm³ | 25.20% | 74.80% |

The third table shows the density of the float 5 for various proportions of POM 7 and micro hollow balls 9.

| POM | Micro hollow balls | Density |
|---|---|---|
| 30% | 70% | 0.50 g/cm³ |
| 20% | 80% | 0.35 g/cm³ |
| 10% | 90% | 0.23 g/cm³ |
| 5% | 95% | 0.17 g/cm³ |

The invention claimed is:

1. A float for a fill level sensor, comprising:
    a fuel-resistant plastic; and
    an expanding means;
    wherein the expanding means are gas-filled plastic balls as microspheres, a proportion of microspheres in the float being between 70% and 87%; and
    wherein the fuel-resistant plastic surrounds the microspheres.

2. The float as claimed in claim 1, wherein the microspheres have an average sphere diameter of from 30 μm to 40 μm.

3. The float as claimed in claim 2, wherein the microspheres have an average sphere diameter of from 34 μm to 38 μm.

4. The float as claimed in claim 1, wherein the float has a density of less than 0.37 g/cm³.

5. A float with a fill level sensor, comprising:
    a fuel-resistant plastic; and
    a filler;
    wherein the filler comprises micro hollow balls; a proportion of the micro hollow balls in the float being between 3% and 98%; and
    wherein the fuel-resistant plastic surrounds the micro hollow balls.

6. The float as claimed in claim 5, wherein the micro hollow balls consist of glass.

7. The float as claimed in claim 5, wherein the micro hollow balls have an apparent density of from 0.09 g/cm³ to 0.1 g/cm³.

8. The float as claimed in claim 5, wherein the proportion of the micro hollow balls is over 70%.

9. The float as claimed in claim 5, wherein the float has a density of less than 0.5 g/cm³.

10. A float for a fill level sensor, comprising:
    a fuel-resistant plastic;
    an expanding agent; and
    a filler;
    wherein the expanding agent comprises gas-filled plastic balls as microspheres,
    wherein the filler comprises micro hollow balls; and
    wherein the fuel-resistant plastic surrounds the microspheres and the micro hollow balls.

11. The float as claimed in claim 10, wherein the microspheres account for a proportion of the float of from 20% to 87%.

12. The float as claimed in claim 10, wherein the micro hollow balls account for a proportion of the float of from 1.5% to 60%.

13. The float as claimed in claim 10, wherein the float contains fuel-resistant plastic in a proportion of from 5% to 14%.

14. The float as claimed in claim 10, wherein the float has a density of from 0.5 g/cm$^3$ to 0.1 g/cm$^3$.

15. The float as claimed in claim 10, wherein the fuel-resistant plastic is polyoxymethylene, polyamide, polyphenylene sulfide, polyaryletherketone, polybutylene terephthalate, high-density polyethylene, polyethylene terephthalate or polyphthalamide.

16. The float as claimed in claim 10, wherein the fuel-resistant plastic is a phenolic resin or an epoxy resin.

17. The float as claimed in claim 10, wherein the float has a receptacle for a lever wire.

18. The float as claimed in claim 17, wherein the receptacle is a bore in the float.

* * * * *